June 23, 1931. W. C. MARTIN 1,811,726
WHEEL CONSTRUCTION
Filed Aug. 3, 1928
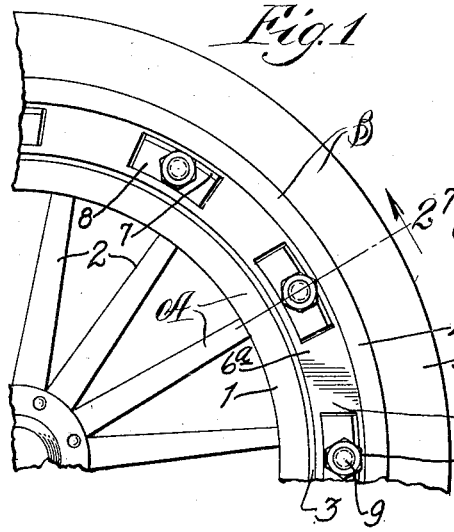
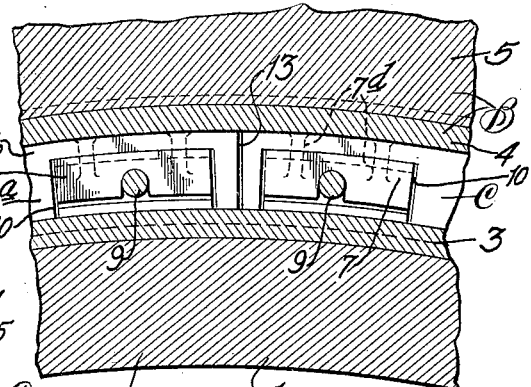
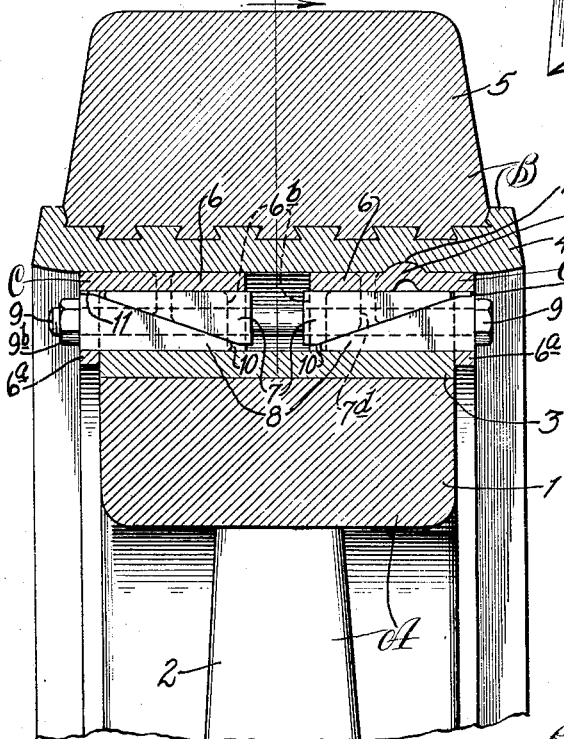
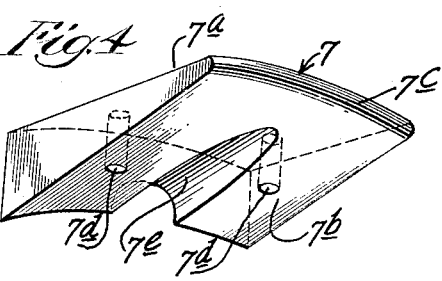
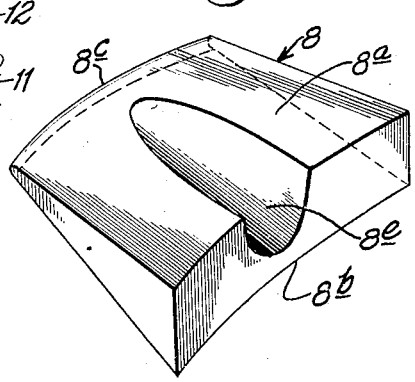
Inventor:
William C. Martin Patented June 23, 1931

1,811,726

UNITED STATES PATENT OFFICE

WILLIAM C. MARTIN, OF CHICAGO, ILLINOIS, ASSIGNOR TO JOHN H. LEE, OF OAK PARK, ILLINOIS

WHEEL CONSTRUCTION

Application filed August 3, 1928. Serial No. 297,158.

This invention relates particularly to wheels equipped with rubber tires; and the primary object is to provide a tire upon the rim of a wheel-center.

The invention is illustrated in a preferred embodiment in the accompanying drawings, in which—

Fig. 1 is a broken elevational view of a wheel embodying the invention; Fig. 2, a broken section taken as indicated at line 2 of Fig. 1; Fig. 3, a broken section taken as indicated at line 3 of Fig. 2; Fig. 4, a perspective view of an inner wedge-block employed; and Fig. 5, a perspective view of an outer wedge-block employed.

In the illustration given, the wheel-center, designated A, comprises a felly 1, spokes 2, and a wheel band or rim 3 shrunk upon the felly; and the tire, designated B, comprises an annular wheel base-rim 4 and an annular tire-member 5 of rubber mounted thereon and preferably vulcanized thereto.

The tire B is securely mounted on the wheel-center through the medium of a pair of supporting-rings C and associated wedge-blocks.

The rings C preferably are split-rings, as will be understood from Fig. 3. Each ring preferably is of channel-form cross-section, having a cylindrical portion 6, an inturned outer flange $6^a$, and an inturned inner flange $6^b$. The flange $6^b$ has its inner edge curved to conform to the rim 3. The outer flange $6^a$ is of sufficient depth to engage the edge of the rim 3.

Each of the rings C is secured between the band 3 of the wheel-center and the member 4 by means of a series of complementary wedge-members 7 and 8, and a series of bolts 9 which extend through the wedge-members, the pairs of wedge-members being preferably in alinement, as will be understood from Fig. 2. Preferably, the inner flange $6^b$ of each ring is provided with slots 10; and, preferably, the outer flanges $6^a$ of the rings are provided with slots 11. The slots of the two rings are in alinement transversely of the wheel.

The blocks 7, which may be designated the inner blocks, are provided with part-cylindrical outer circumferential surfaces $7^a$ and inner concave surfaces $7^b$ which incline away from the center of the wheel and towards the lateral side of the wheel. That is, the blocks taper to the point $7^c$ near the side of the wheel. Blocks 7 preferably are secured to the wall 6 of the ring, as by means of rivets which pass through perforations $7^d$ with which the blocks are provided. The wedge-blocks 8, which may be designated the outer blocks (although within the blocks 7 circumferentially) have outer circumferential surfaces $8^a$ which incline toward the central plane of the wheel and toward the wheel-center and have inner part-cylindrical concave surfaces $8^b$ which embrace the rim 3. Thus, the blocks 8 taper inwardly to an edge or tip $8^c$.

The blocks 7 are provided at their inner circumferential surfaces with slots or recesses $7^e$; and the blocks 8 are provided on their outer circumferential surfaces with slots or recesses $8^e$ which are complemental with respect to the recesses $7^e$. These recesses permit the bolts 9 to extend between the blocks of each pair of alined pairs of blocks. The bolts 9 are provided with heads $9^a$ and nuts $9^b$. Thus, it will be understood that when the bolts are tightened, inasmuch as the blocks 7 are riveted to the rings C, the wedge-members 8 will be forced towards each other, and thus the rings will be firmly wedged between the rim 3 of the wheel-center and the tire-base 4.

Preferably, one of the rings C is provided with a circumferential bead 12 which engages a corresponding annular recess $12^a$ with which the tire-base 4 is provided. Thus, possibility of the tire-base shifting with reference to the wedge-rings is obviated.

The improved construction enables economies to be effected. The alined pairs of wedge-blocks may be spaced circumferentially around the wheel, as desired. The flanges of the rings C stiffen the rings between the points which are supported by the wedge-blocks, and thus prevent buckling of the tire-base. Also, by reason of the arrangement of the tapers of the wedge-blocks, a single bolt serves for the tightening of the wedge-blocks of two transversely alined pairs. Thus, a single annular row of bolts extending across the wheel in the space between the rim 3 and tire-base 4 and passing through the flanges of the channel-form wedge-rings, serves to secure the tire immovably upon the wheel-center with the utmost staunchness. In fact, it has been demonstrated that the security of the connection is as great as in those constructions where wheel-centers are forced into the tire-bases under hydraulic pressure.

Notwithstanding the security of the mounting, the tire may be removed from the wheel-center with great facility, when desirable or necessary.

In Fig. 3, a slight space between the ends of the split-ring is designated 13.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In combination; a wheel-center; an encircling tire having an annular base; a pair of rings interposed between the wheel-center and said annular base; a series of wedge-devices associated with each ring, comprising a circle of wedge-blocks within the ring having out-turned points and a circle of complementary wedge-blocks within the first-mentioned circle having inturned points, each pair of blocks associated with one ring being in alinement with a pair of blocks associated with the other ring; and an annular series of bolts, each bolt extending through two alined pairs of blocks and serving to draw the inwardly tapering members thereof together.

2. In combination; a wheel-center; an encircling tire having an annular base; a pair of rings of channel-form cross-section having inturned flanges provided with slots; an inner series of outwardly tapering wedge-blocks connected with each ring; an outer series of inwardly tapering wedge-blocks associated with each ring and underlying the first-mentioned wedge-blocks, the wedge-blocks of each ring being in transverse alinement with the wedge-blocks of the other ring; and an annular series of bolts connecting the wedge-blocks, each bolt extending through alined pairs of wedge-blocks and serving to draw towards each other the inwardly tapering wedge-blocks.

3. The construction specified in claim 2, in which the outwardly tapering wedge-blocks are riveted to the web-portions of the channel-form rings.

4. The construction specified in claim 2, in which the outer flanges of the channel-form rings engage the lateral edges of the periphery of the wheel-center.

5. The construction specified in claim 1 in which the wedge-blocks having the outturned points are riveted to the web-portions of the rings.

6. The construction specified in claim 1 in which the rings have felly-engaging flanges turned towards the wheel-center which are provided with slots and in which the wedge-blocks having outturned points are in registration with said slots and riveted to the web-portions of the rings.

7. In wheel construction: a pair of rings having felly-engaging flanges provided with slots; a series of outwardly tapering wedge-blocks secured within each ring in registration with said slots; another series of inwardly tapering wedge-blocks encircled by and engaging the first-mentioned blocks; and a single series of bolts extending through aligned pairs of said wedge-blocks and serving to draw the inwardly tapering wedge-blocks toward each other.

WILLIAM C. MARTIN.